(12) United States Patent
Song et al.

(10) Patent No.: US 9,187,857 B2
(45) Date of Patent: Nov. 17, 2015

(54) LAUNDRY MACHINE

(75) Inventors: Jung Tae Song, Changwon-si (KR);
Hyun Seok Seo, Changwon-si (KR); Ig Geun Kwon, Changwon-si (KR); Min Gyu Jo, Changwon-si (KR); Hee Tae Lim, Changwon-si (KR); Soo Bong Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1090 days.

(21) Appl. No.: 13/142,633

(22) PCT Filed: Dec. 30, 2009

(86) PCT No.: PCT/KR2009/007967
§ 371 (c)(1),
(2), (4) Date: Sep. 28, 2011

(87) PCT Pub. No.: WO2010/077095
PCT Pub. Date: Jul. 8, 2010

(65) Prior Publication Data
US 2012/0006068 A1    Jan. 12, 2012

(30) Foreign Application Priority Data

| Dec. 30, 2008 | (KR) | 10-2008-0136406 |
| May 28, 2009 | (KR) | 10-2009-0047192 |
| Aug. 27, 2009 | (KR) | 10-2009-0079829 |
| Dec. 30, 2009 | (KR) | 10-2009-0133876 |

(51) Int. Cl.
*D06F 37/20* (2006.01)
*D06F 37/26* (2006.01)
(Continued)

(52) U.S. Cl.
CPC ............ *D06F 37/206* (2013.01); *D06F 37/22* (2013.01); *D06F 37/262* (2013.01); *F16J 15/3276* (2013.01)

(58) Field of Classification Search
CPC .............................. D06F 37/206; D06F 37/22
USPC ............................................... 68/24, 58, 140
See application file for complete search history.

(56) References Cited

U.S. PATENT DOCUMENTS

| 2,579,472 A | 12/1951 | Chamberlin et al. ............. 68/24 |
| 2,836,046 A | 5/1958 | Smith .............................. 68/24 |

(Continued)

FOREIGN PATENT DOCUMENTS

| AU | 2802077 A | 2/1979 |
| CN | 1296536 A | 5/2001 |

(Continued)

OTHER PUBLICATIONS

Machine translation of KR 1020040018522 A, no date.*

(Continued)

*Primary Examiner* — Joseph L Perrin
(74) *Attorney, Agent, or Firm* — Ked & Associates, LLP

(57) ABSTRACT

A laundry machine is disclosed. A laundry machine includes a tub (120) to hold water therein, a drum (320) provided in the tub (120), a shaft (351) connected to the drum (320), passing the tub (120), a bearing housing (400) secured to the tub (120), the bearing housing (400) supporting the shaft (351) and a motor (M) rotating the shaft (351), and a water seal (10) provided between the tub (120) and the bearing housing (400) to maintain gas tight of the bearing housing (400) and of the shaft (351). As a result the laundry machine may improve capacity of the tub (120) and maintain gas tight of the tub (120) efficiently.

10 Claims, 9 Drawing Sheets

(51) Int. Cl.
*D06F 37/22* (2006.01)
*F16J 15/32* (2006.01)

(56) References Cited

U.S. PATENT DOCUMENTS

| | | | |
|---|---|---|---|
| 3,022,656 A | 2/1962 | Bergeson et al. | 68/207 |
| 3,038,639 A | 6/1962 | Anderson | 222/70 |
| 3,066,522 A | 12/1962 | Steinmüuller | 68/24 |
| 3,089,326 A | 5/1963 | Belaieff | 68/24 |
| 3,385,085 A | 5/1968 | Engel | 68/18 |
| 3,854,733 A | 12/1974 | Wilson | 277/82 |
| 5,105,636 A * | 4/1992 | Anastase et al. | 68/140 |
| 5,353,613 A * | 10/1994 | Smith et al. | 68/23.7 |
| 5,860,300 A | 1/1999 | Valent | 68/24 |
| 6,148,647 A | 11/2000 | Kabeya et al. | 68/140 |
| 6,354,115 B1 * | 3/2002 | Zahn | 68/23.7 |
| 7,536,882 B2 | 5/2009 | Kim et al. | 68/24 |
| 7,571,625 B2 | 8/2009 | Chang | 68/24 |
| RE41,621 E * | 9/2010 | Kim et al. | 68/24 |
| 2003/0121294 A1* | 7/2003 | Ryu et al. | 68/58 |
| 2004/0123631 A1 | 7/2004 | Chang | 68/23.1 |
| 2004/0163426 A1 | 8/2004 | Kim et al. | 68/23 |
| 2005/0274159 A1 | 12/2005 | Jeon et al. | 68/23.1 |
| 2006/0016228 A1* | 1/2006 | Chang et al. | 68/23.1 |
| 2006/0191302 A1* | 8/2006 | Kim et al. | 68/140 |
| 2006/0196233 A1* | 9/2006 | Kim et al. | 68/140 |
| 2006/0254321 A1 | 11/2006 | Lim et al. | 68/12.01 |
| 2007/0017261 A1* | 1/2007 | Chang et al. | 68/23.1 |
| 2007/0137260 A1* | 6/2007 | Shikamori et al. | 68/3 R |
| 2007/0227200 A1 | 10/2007 | Kim et al. | |
| 2007/0277559 A1* | 12/2007 | Compains et al. | 68/17 R |
| 2008/0067879 A1* | 3/2008 | Kim et al. | 310/43 |
| 2008/0307833 A1* | 12/2008 | Chang et al. | 68/23.1 |
| 2009/0044574 A1 | 2/2009 | Lim et al. | |
| 2009/0107187 A1 | 4/2009 | Kim et al. | 68/140 |
| 2009/0113943 A1 | 5/2009 | Lee | |

FOREIGN PATENT DOCUMENTS

| | | | |
|---|---|---|---|
| CN | 1511997 A | 7/2004 | |
| CN | 1707010 A | 12/2005 | |
| CN | 1724742 A | 1/2006 | |
| CN | 1932126 A | 3/2007 | |
| CN | 1940166 A | 4/2007 | |
| CN | 101046046 A | 10/2007 | |
| CN | 201187000 Y | 1/2009 | |
| DE | 297 16 968 U1 | 11/1997 | |
| EP | 0 414 298 A1 | 2/1991 | |
| EP | 0 655 523 A1 | 5/1995 | |
| EP | 874078 A2 * | 10/1998 | |
| EP | 1 040 257 A1 | 10/2000 | |
| EP | 1 079 014 A1 | 2/2001 | |
| EP | 1 094 144 A2 | 4/2001 | |
| EP | 1 433 890 A2 | 6/2004 | |
| EP | 1 433 891 A2 | 6/2004 | |
| EP | 1 445 368 A2 | 8/2004 | |
| EP | 1 605 088 A2 | 12/2005 | |
| EP | 1 619 286 A2 | 1/2006 | |
| EP | 1 688 531 A1 | 8/2006 | |
| EP | 1 746 192 A2 | 1/2007 | |
| EP | 1 770 199 A2 | 4/2007 | |
| EP | 1 840 257 A1 | 10/2007 | |
| EP | 1 881 099 A1 | 1/2008 | |
| FR | 2215503 A1 | 8/1974 | |
| GB | 2 029 862 A | 3/1980 | |
| GB | 2 174 513 A | 11/1986 | |
| JP | 2006-068273 A | 3/2006 | |
| JP | 2008-194090 A | 8/2008 | |
| KR | 1020040018522 A * | 9/2005 | |
| RU | 1772266 A1 | 10/1992 | |
| WO | WO 2008069607 A2 * | 6/2008 | |
| WO | WO 2008/099551 A1 | 8/2008 | |
| WO | WO 2008/103007 A2 | 8/2008 | |

OTHER PUBLICATIONS

Chinese Office Action dated Mar. 20, 2013 issued in Application No. 201080017292.X (with English Translation).
Chinese Office Action dated Mar. 25, 2013 issued in Application No. 201080021205.8 (with English Translation).
Chinese Office Action dated Mar. 28, 2013 issued in Application No. 201080020149.6 (with English Translation).
Chinese Office Action dated Mar. 28, 2013 issued in Application No. 201080021234.4 (with English Translation).
Russian Decision to Grant a Patent dated Aug. 29, 2013 issued in Application 2011132013 (with English translation).
Chinese Office Action dated Oct. 10, 2012 issued in Application No. 200980155600.2 (with English translation).
European Search Report dated Oct. 26, 2012 issued in Application No. 10 78 0809.
PCT International Search Report dated Sep. 13, 2010 issued in Application No. PCT/KR2009/007967.
International Search Report and Written Opinion dated Oct. 27, 2010 issued in Application No. PCT/KR2010/003381.
International Search Report and Written Opinion dated Oct. 27, 2010 issued in Application No. PCT/KR2010/003402.
International Search Report dated Oct. 15, 2010 issued in Application No. PCT/KR2009/008003.
International Search Report dated Oct. 27, 2010 issued in Application No. PCT/KR2010/003382.
International Search Report dated Nov. 24, 2010 issued in Application No. PCT/KR2010/003383.
European Search Report dated Aug. 1, 2012 issued in Application No. 09 83 6416.
Mexican Office Action dated Feb. 13, 2014 issued in Application No. MX/a/2011/007091 (with English translation).
European Search Report dated Feb. 19, 2014 issued in Application No. 10 78 0818.
European Search Report dated Feb. 24, 2014 issued in Application No. 10 78 0807.
U.S. Office Action dated Nov. 20, 2014 issued in U.S. Appl. No. 13/259,626.
U.S. Office Action dated Jan. 14, 2015 issued in U.S. Appl. No. 13/320,676.
U.S. Office Action issued in U.S. Appl. No. 13/259,626 dated Apr. 9, 2015.
U.S. Office Action issued in U.S. Appl. No. 13/259,670 dated Apr. 23, 2015.
United States Office Action dated Aug. 7, 2014 issued in U.S. Appl. No. 13/258,732.
Russian Decision to Grant a Patent dated Sep. 11, 2014 issued in Application No. 2011153799.
United States Office Action dated Sep. 18, 2014 issued in U.S. Appl. No. 13/259,670.

* cited by examiner

LAUNDRY MACHINE

TECHNICAL FIELD

The present invention relates to a laundry machine, more specifically, to a laundry machine that is able to improve a structure thereof and gas tight of a tub in order to improve a washing capacity.

BACKGROUND ART

Generally, washing machines are home appliances that remove various dirt attached clothes, bedding, cloth items and the like (hereinafter, laundry) by using both friction of water currents caused by rotation of a drum and a shock applied to the laundry. Automatic laundry machines released recently may automatically perform a series of cycles, for example, a washing, rinsing and dry-spinning cycle, without a user's manual operation.

Recently, drum type laundry machines have getting popular more and more, because they have the heightened little trouble of wrinkles and tangling of laundry in comparison to pulsator type laundry machines having a tub rotated in a state of mounted vertically.

As a structure thereof will be schematically described, such a drum type laundry machine includes a cabinet defining an external appearance thereof, a tub mounted in the cabinet to hold wash water therein, a cylindrical-shaped drum provided in the tub to hold laundry therein. Here, the tub is supported by a damper and a spring and the drum receives a driving force from a driving assembly to wash the laundry.

The drum type laundry machine having the structure mentioned above cannot help generating vibration because of a rotational force thereof and eccentricity of the laundry when rotated to wash and dry-spin the laundry introduced therein. The vibration generated by the rotation of the drum is transmitted outside via the tub and the cabinet.

Because of that, the spring and the damper should be provided between the tub and the cabinet to dampen vibration generated between the tub and the cabinet and to prevent the vibration of the drum from being transmitted to the tub and next to the cabinet.

Such the drum type laundry machine mentioned above are usually installed in existing installation environments, for example, sink or built-in environments, not installed in auxiliary space independently. As a result, the size of such the drum type laundry machine has to be limited corresponding to its installation environments.

It is limited to change the inner structure of the above conventional drum type laundry machine because of the structure including the spring and damper to dampen the vibration between the tub and the cabinet and also it is limited to change the size of the laundry machine itself because its installation environments are limited.

In the meanwhile, researches and developments for increasing the washing capacity of the laundry machine have been in progress quite a lot recently to increase washing efficiency and user convenience. However, it is difficult in the limited conditions of the conventional drum type laundry machine to increase the size of the tub in order to increase the washing efficiency.

As a result, development of laundry machines having a diversified structure capable of increasing the washing efficiency has been required.

DISCLOSURE OF INVENTION

Technical Problem

To solve the problems, an object of the present invention is to provide a drum type laundry machine having a totally new structure of supporting a drum. Specifically, different from the conventional laundry machine, vibration of the drum is suspendedly supported, not transmitted to the tub.

Another object of the present invention is to provide a laundry machine having an improved sealing-structure of a tub to maintain gas tight of a tub efficiently and to enlarge the capacity of tub.

Solution to Problem

To achieve these objects and other advantages and in accordance with the purpose of the invention, as embodied and broadly described herein, a laundry machine includes a tub fixed in the cabinet; a drum provided in the tub; a shaft connected to the drum, passing the tub; a bearing housing secured to the tub, the bearing housing supporting the shaft and a motor rotating the shaft; and a water seal provided between the tub and the bearing housing to maintain gas tight of the bearing housing and of the shaft.

The tub may include a tub back rotatable with respect to the tub, the tub back through which the shaft passes.

The water seal may include a water seal body to maintain gas tight between the tub back and the bearing housing.

A pressing portion may be formed in the tub back to press the water seal body toward the bearing housing.

A ring-shaped sealing groove may be formed in the pressing portion to improve the gas tight with the water seal body.

A securing rib may be extended in the water seal toward the bearing housing to be secured to the bearing housing and a securing projection may be formed in the bearing housing to insert the securing rib therein.

A plurality of engaging projections may be formed in an inner circumferential surface of the securing projection and a plurality of engaging protrusions may be formed in an outer circumferential surface of the securing rib to be insertedly engaged with the engaging projections.

The bearing housing may include a shaft hole to support the shaft rotatbly and the water seal may be insertedly secured to the shaft hole.

The shaft hole may be formed in the securing projection in which the water seal is inserted and the water seal may be formed in an inner circumferential surface of the securing projection correspondingly.

A plurality of the engaging projections may be formed inner circumferential surface of the securing projection and a plurality of engaging protrusions may be formed in an outer circumferential surface of the securing rib to be insertedly engaged with the engaging projections.

The water seal may include a sealing rib extended from the securing rib toward the shaft to maintain gas tight of the shaft.

A plurality of oblique sealing ribs may be formed in an end of the sealing rib to maintain the gas tight, with contacting with the shaft obliquely.

In another aspect of the present invention, a laundry machine includes a cabinet; a tub fixed in the cabinet, the tub having a rear opening formed therein; a drum rotatably provided in the tub; a tub back to close the rear opening of the tub; a shaft passing the tub back from a rear surface of the drum; a bearing housing secured to the tub back, the bearing housing supporting the shaft rotatably; a damper bracket supporting the bearing housing dampingly; and a water seal disposed between a rear surface of the tub and the bearing housing, allowing the shaft passing there through to maintain gas tight of the tub back and of the shaft.

A cylinder-shaped securing rib may be extended from the water seal toward the bearing housing and a securing projection in which the securing rib is inserted may be formed in an inner circumferential surface of the bearing housing.

A plurality of engaging protrusions may be formed in an outer circumferential surface of the securing rib and a plurality of engaging grooves with which the engaging protrusions are engaged may be formed in an inner circumferential surface of the securing projection.

A water seal body projectedly extended to an end of the bearing housing may be formed in an outer circumferential surface of the water seal.

A sealing rib may be formed in the water seal, with contacting an outer circumferential surface of the shaft closely to maintain the gas tight of the shaft.

A plurality of oblique sealing portions in contact with the outer circumferential surface of the shaft may be formed in an end of the sealing rib, with being obliquely opposite to an axial direction of the shaft.

The tub back may be movable between an inner circumferential surface of the rear opening of the tub and an outer circumferential surface of the tub back, and a rear gasket is provided between the tub and the tub back to maintain gas tight there between.

In the laundry machine, the tub may be fixedly supported, or be supported by a flexible support structure, such as the suspension unit.

Further, the tub may be supported in an interim state between the fixed support and the flexible support.

That is, the tub may be flexibly supported by the suspension unit or be rigidly supported. For example, the tub may be supported by the suspensions, be supported by rubber bushings to provide less flexible movement than when supported by the suspensions, or be fixedly supported by being fixed somewhere by screws or so.

For another instance, the cases where the tub is supported more rigidly than when supported by the suspension unit are as follows.

Firstly, the tub may be made intergrally with the cabinet.

Next, the tub may be supported by being fastened by screws, ribets, rubber bushings, etc. Also, the tub may be welded or bonded to the cabinet. In this cases, the supporting or fastening members have larger stiffnesses than a stiffness of the suspension unit with respect to the main direction of the vibration of the drum.

The tub may be expanded within the limits of a space in which the tub is placed. That is, the tub may be expanded until the circumferential surface thereof reaches(or almost reaches) a side wall or a side frame (for example, a left or right plate of a cabinet) restricting the size of the space at least in the lateral direction (the direction laterally perpendicular to the axial direction of the rotary shaft when the rotary shaft is horizontally placed). The tub may be made intergally with the lateral side walls of the cabinet.

The tub may be formed to be closer in the lateral direction to the wall or the frame than the drum. For example, the tub may be spaced away from the wall or the frame by an interval of less than 1.5 times an interval with the drum. Under the condition that the tub is enlarged in the lateral direction, the drum may also be enlarged in the lateral direction. Further, if the lateral interval between the tub and drum is reduced, the drum may be expanded in the lateral direction in direct proportion. When the lateral interval between the tub and the drum is reduced, the vibration of the drum in the lateral direction may be considered. The weaker the vibration of the drum in the lateral direction, the more expanded is the diameter of the drum. Therefore, the suspension unit to reduce the vibration of the drum may be designed such that rigidity of the suspension unit in the lateral direction is greater than rigidities of the suspension unit in other directions. For example, the suspension unit may be designed such that rigidity of the suspension unit against displacement in the lateral direction is greatest compared with rigidities of the suspension unit against displacements in other directions.

Further, the suspension unit may be directly connected to the bearing housing supporting the rotary shaft. That is, the bearing housing comprises a supporting portion to rotatably support the shaft and an extended portion extended from the supporting portion, and the suspension unit is attached to the supporting portion of the bearing housing or the extended portion of the bearing housing.

The suspension unit may include brackets extended in the axial direction. In a front loading type laundry machine, the brackets may be extended forward, namely towards a door.

The suspension unit may comprises at least two suspensions which are arranged distant from each other in the axial direction of the shaft.

The suspension unit may comprise suspensions placed below the shaft for standing support. The supported object (for example, the drum) is supported by the suspensions to stand alone.

Alternately, the suspension unit may comprise suspensions placed over the shaft for hanging support. In this case, the supported object is supported to be hung.

The mass center of the vibrating object(for example, a combination of the drum, the shaft, the bearing housing, and the motor) may be located, with respect to the center of the longitudinal length of the drum, at a side where the motor is located. In a front loading type laundry machine, the mass center may be located behind the longitudinal center of the drum. In this case, at least one suspension may be placed in front of or behind the mass center. One suspension may be placed in front of the mass center and another suspension behind the mass center.

The tub may be provided with an opening at a rear portion thereof. The drive assembly may be connected to the tub by a flexible member. The flexible member may seal between the tub and the drive assembly to prevent water from leaking through the opening of the rear portion of the tub, and allow the drive assembly to move relatively to the tub. The flexible member may be made of a flexible material which can do the sealing, for example, a gasket material like a front gasket. In this case, the flexible member may be referred to as a rear gasket for convenience. The rear gasket may be connected to the drive assembly under the condition that the rotation of the rear gasket at least in the rotational direction of the rotary shaft is constrained. In one embodiment, the flexible material may be directly connected to the shaft. In another embodiment, the flexible material may be connected to a portion of the bearing housing.

Further, a portion of the drive assembly, which is located radially inside the rear gasket and thus is likely to be exposed to the water in the tub, may be made so as no to be corroded by the water. For example, the portion of the drive assembly may be coated, or be surrounded with a separate member made of plastic such as the tub back(which will be described below). In a case where the portion of the drive assembly is made of metal, the portion may not be directly exposed to water by the coating or the separate plastic member, and thus corrosion of the portion may be prevented.

Further, the cabinet may not be necessary. For example, in a built-in laundry machine, the laundry machine without the cabinet may be installed within a space of a wall structure. However, even in this case, a front plate forming the front face of the laundry machine may be required.

Advantageous Effects Of Invention

The present invention has following advantageous effects. The drum type laundry machine according to the present invention has a totally new structure of supporting a drum. Specifically, different from the conventional laundry machine, vibration of the drum is suspendedly supported, not transmitted to the tub.

Furthermore, the laundry machine has an improved sealing-structure of a tub to maintain gas tight of a tub efficiently and to enlarge the capacity of tub.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

As follows, a laundry machine according to an exemplary embodiment of the present invention will be described in reference to the accompanying drawings.

Reference will now be made in detail to the specific embodiments of the present invention, examples of which are illustrated in the accompanying drawings. Wherever possible, the same reference numbers will be used throughout the drawings to refer to the same or like parts.

Figure 1:
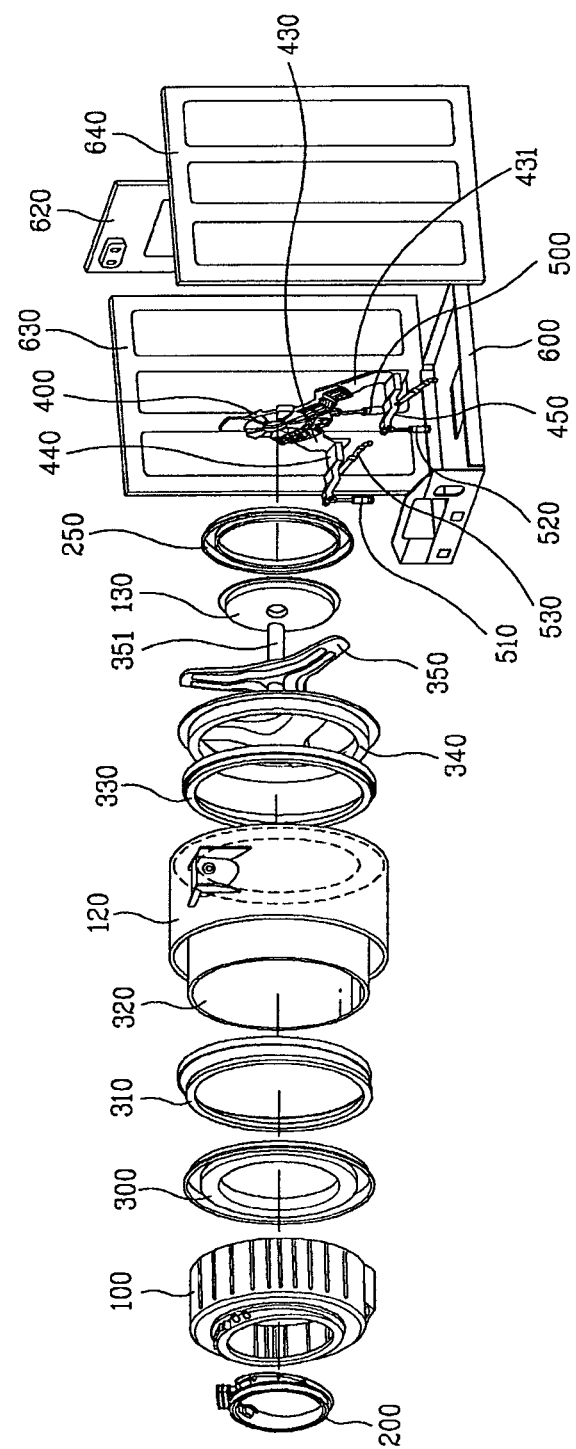
FIG. 1 is an exploded perspective view illustrating a laundry machine according to an exemplary embodiment of the present invention.

FIG. 1 is an exploded perspective view illustrating the laundry machine according to the exemplary embodiment of the present invention.

As shown in FIG. 1, the laundry machine includes a tub fixedly mounted to a cabinet. The tub includes a tub front 100 defining a front portion thereof and a tub rear 120 defining a rear portion thereof. The tub front 100 and the tub rear 120 are assembled by a screw and they may form a predetermined space to hold a drum. The tub further includes a tub back 130 defining a rear portion thereof and the tub back 130 is connected with the tub rear via a rear gasket 250. The rear gasket 250 is formed of flexible material not to transmit the vibration of the tub back 130 to the tub rear 120.

The tub rear 120 includes a rear surface 128 and the rear surface 128 forms a rear wall of the tub together with the tub back 130 and the rear gasket 250. The rear gasket 250 is sealedly connected to both of the tub back 130 and the tub rear 120, respectively, such that wash water inside the tub may be prevented from leaking. The tub back 130 is vibrated together with the drum during the rotation of the drum. Because of that, the tub back 130 is spaced apart a predetermined distance from the tub rear 120 enough not to interfere with the tub rear 120. As the rear gasket 250 is made of flexible material, the tub back 130 may interfere with the tub rear 120 and allow the tub back 130 to relative-move. The rear gasket 250 may include a winkle portion (252, see FIG. 4) extendible enough to allow such the relative motion of the tub back 130.

A foreign-substance-prevention-member 200 is connected to a front portion of the tub front 100 to prevent foreign substances from being stuck between the tub and the drum. The foreign-substance-prevention member 200 is made of flexible material and it is fixedly provided in the tub front 100 and it may be made of the same material of the rear gasket 250.

The drum may include a drum front 300, a drum center 320 and a drum back 340. Ball balancers 310 and 330 are installed in front and rear portions of the drum, respectively. The drum back 340 is connected with a spider 350 and the spider 350 is connected with a shaft 351. The drum is rotatable within the tub by the rotational force transmitted via the shaft 351.

The shaft 351 is directly connected to a motor, passing though the tub back 130, specifically, to a rotor of the motor. A bearing housing 400 is coupled to the rear surface 128 of the tub back 130 and the bearing housing 400 located between the motor and the tub back 130 rotatably supports the shaft 351.

A stator of the motor is fixedly installed in the bearing housing 400 and the rotor surrounds the stator. As mentioned above, the rotor is directly connected with the shaft 351. The motor is an outer-rotor type motor and it is directly connected with the shaft 351.

The bearing housing 400 is supported by a base 600 of the cabinet via a suspension unit. The suspension unit includes three vertical suspensions and oblique suspensions that are supported obliquely with respect to a forward/rearward direction. The suspension unit is connected to the base 600 of the cabinet flexibly enough to allow the drum to move forward/rearward and rightward/leftward, not connected fixedly.

That is, the suspension unit is supported by the cabinet base flexibly enough to enable predetermined rotation with respect to the connected portion in a forward/rearward and rightward/leftward direction. The vertical suspensions may be connected to the base 600 by rubber-bushing. The vertical ones of the suspensions are configured to suspend the vibration of the drum flexible and the oblique ones of the suspensions are configured to damp the vibration. In other words, the vertically installed ones of the vibrating system including the spring and the damping means are employed as spring and the obliquely installed ones as damping means.

The other elements of the tub except the tub back 130 are fixedly installed in the cabinet and the vibration of the drum is suspendedly supported by the suspension unit. It can be said that the supporting structure of the tub is substantially separated from that of the drum and that the tub is not vibrated during the vibration of the drum.

As follows, each element will be described in detail.

Figure 2:
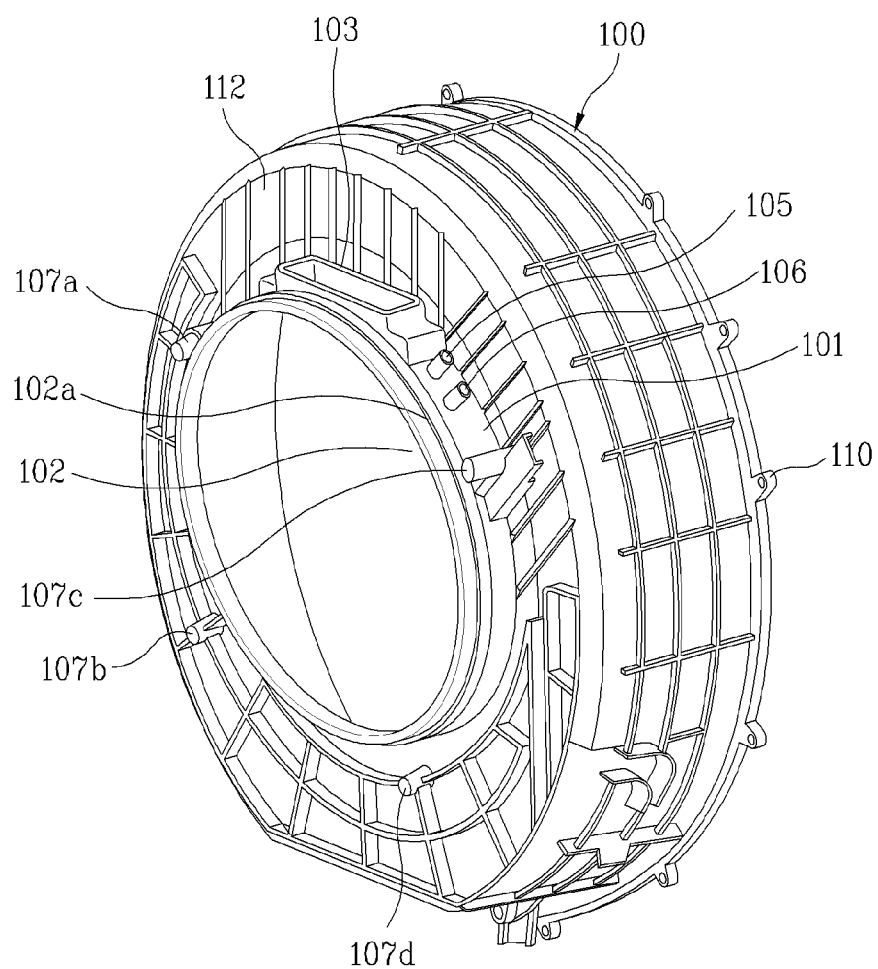
FIGS. 2 and 3 are perspective views illustrating a tub front of the laundry machine.
Figure 3:
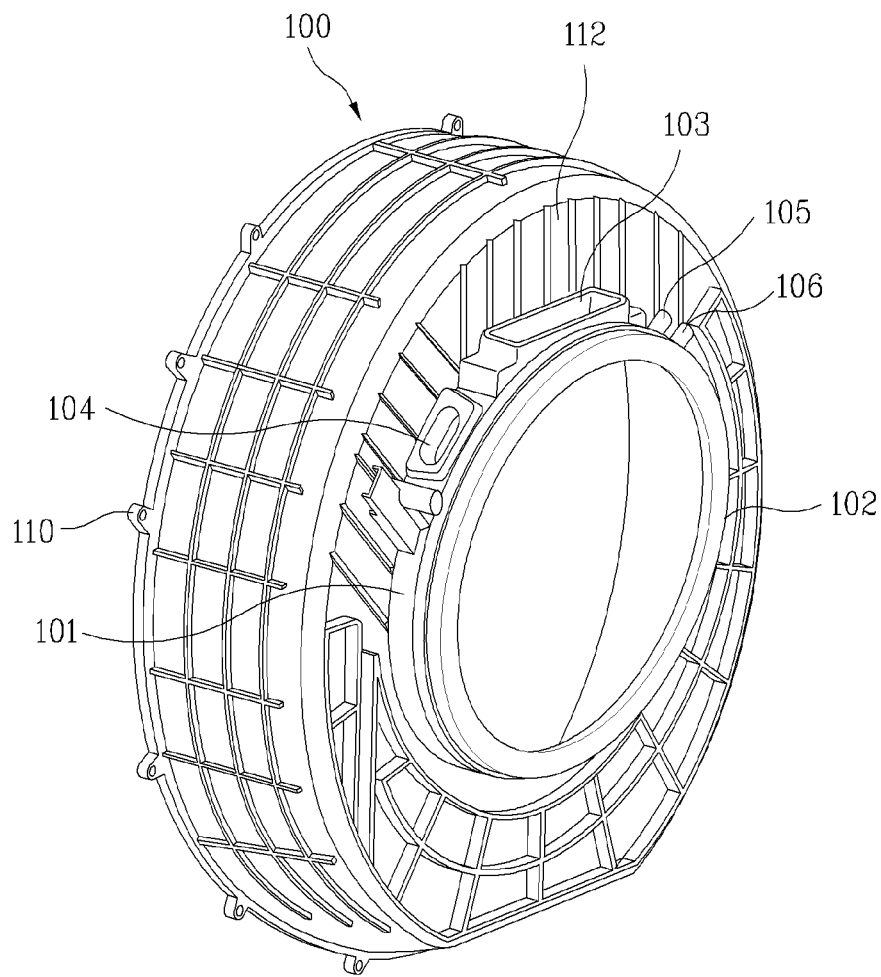

FIGS. 2 and 3 are diagrams illustrating the tub front 100. The tub front 100 has a donut-shaped vertical front surface formed in a cylindrical front portion defining a predetermined size wall portion of the tub. A rear portion of the cylindrical surface is open and a plurality of coupling holes 110 are formed in the rear portion. The coupling holes 110 are coupled with corresponding coupling holes (127, see FIG. 4) of the tub rear 120.

A rim portion 101 is extended forward from an inner circumferential surface of the front surface of the tub front 100 and the width of the rim portion 101 is getting smaller downward from a top of the rim portion 101. Here, the rim portion 191 may not be formed in a bottom of the inner circumference of the front surface substantially.

There may be formed in the rim portion 101 a water supply hole 104 to supply water, a hot air inlet 103 used to dry the laundry, a circulated water inlet 106 drawing the water circulated by a circulation pump there through and a steam inlet 105 drawing steam there through.

As the laundry machine according to the present invention has the structure having the noticeably reduced vibration of the tub, a water supply configuration such as a water supply hose, a drying configuration such as a drying duct, a steam supply configuration and a circulated-water supply configuration may be connected stably.

The hot air inlet 103 is approximately rectangular shaped and it is extended upward from the rim portion 101. Here, the hot air inlet 103 is required in a laundry machine having drying and washing functions and it is not necessary in a laundry machine having no drying function.

Water supply, for example, may be performed in the front portion of the tub because the water supply hole 104 and the like are formed in the front portion of the tub front 100.

The water supply hole 104 and the like may be in front of a front end of the drum accommodated in the tub. As a result, water to wash the laundry may be directly supplied to the drum inside via the opening formed in the drum to introduce the laundry. Fluidal material supplied to treat the laundry, for example, water, hot air and steam is directly drawn into the drum inside such that relatively more efficient washing treatment may be enabled. In case detergent is supplied via a detergent box together with the wash water, the detergent may be directly supplied to the drum inside and then detergent usage may be reduced such that water usage may be reduced. Because of that, detergent remnants accumulating in the bottom of the tub only to contaminate the drum may be reduced. In addition, if the water is supplied to the drum from the front portion of the tub, the supplied water may wash and clean a door glass (not shown) as well.

Even in case the hot air is supplied from the front portion of the tub, the flow of the hot air supplied from the vertical surface of the tub front 100 may be bent two times like '??' shape, which is formed after the hot air flowing to the front portion from the rear portion of the tub is bent downward and re-bent via the vertical surface of the tub. Because of that, the hot air path bent two times would make the hot air not flow smoothly. However, if the hot air inlet 103 is formed in the rim portion 101 of the tub front 100, the hot air may be bent one time in a vertical direction only to flow smoothly and efficiently.

The water supply hole 104 and the other configurations are located beyond the center of the drum. The water and the other fluidal material may be supplied to the drum inside from a predetermined portion beyond the front of the drum. If the water and the like are needed to be supplied to the drum inside from a portion below the front of the drum, the rim portion 101 of the tub front 100 may be alternatively formed in a lower portion of the front surface. Also, if the water and the like are needed to be supplied in a horizontal direction, the rim portion 101 may be formed in a center portion 103 of the inner circumference of the front surface. That is, the shape of the rim portion 101 may be diversified according to the direction of the fluidal materials supplied to the drum A securing part 102 is formed in a front end of the rim portion 101 and the foreign-substance-prevention member 200 is secured to the securing part 102. The securing part 102 is extended forward from the front end of the rim portion 101, having an approximately small cylindrical shape and a rib 102a is formed in an outer circumferential surface of such the small cylindrical shaped securing part 102.

The securing part 102 is inserted in the foreign-substance-prevention member 200 to secure the foreign-substance-prevention member 200 thereto. The foreign-substance-prevention member 200 includes an insertion groove (not shown) to make the small cylindrical-shaped surface having the rib 102a inserted in the insertion groove.

The tub front 100 is fixedly connected to a cabinet front (not shown). For such the fixed connection, securing bosses 107a, 107b, 107c and 107d are formed in the front surface of the tub front, approximately surrounding the rim portion 101. After the cabinet front (not shown) is located in a state of the tub front 100 being installed, a screw is fastened from a forward direction to a rearward direction.

FIG. 3 is a rear view of the tub front inside.

The steam inlet 105 may be connected to the steam hose. A steam guide 105a is formed to guide the steam drawn in the steam inlet 105 toward the drum inside and a circulated-water guide 106a is formed to guide circulated-water drawn via the circulated-water inlet 106 toward the drum inside. The steam inlet 105, the circulated-water inlet 106, the steam guide 105a and the circulated-water guide 106a are integrally formed in the tub front. The tub front 100 is plastic-molded and the steam inlet 105 and the like are injection-molded at this time.

The tub front 100 is coupled with the tub rear 120 only to form the space capable of accommodating the drum and the tub front and the tub rear 120 are fastened by a screw and for this screw-fastening, a plurality of screw fastening holes 110 are formed in the rear portion of the tub front along a circumferential direction.

Figure 4:
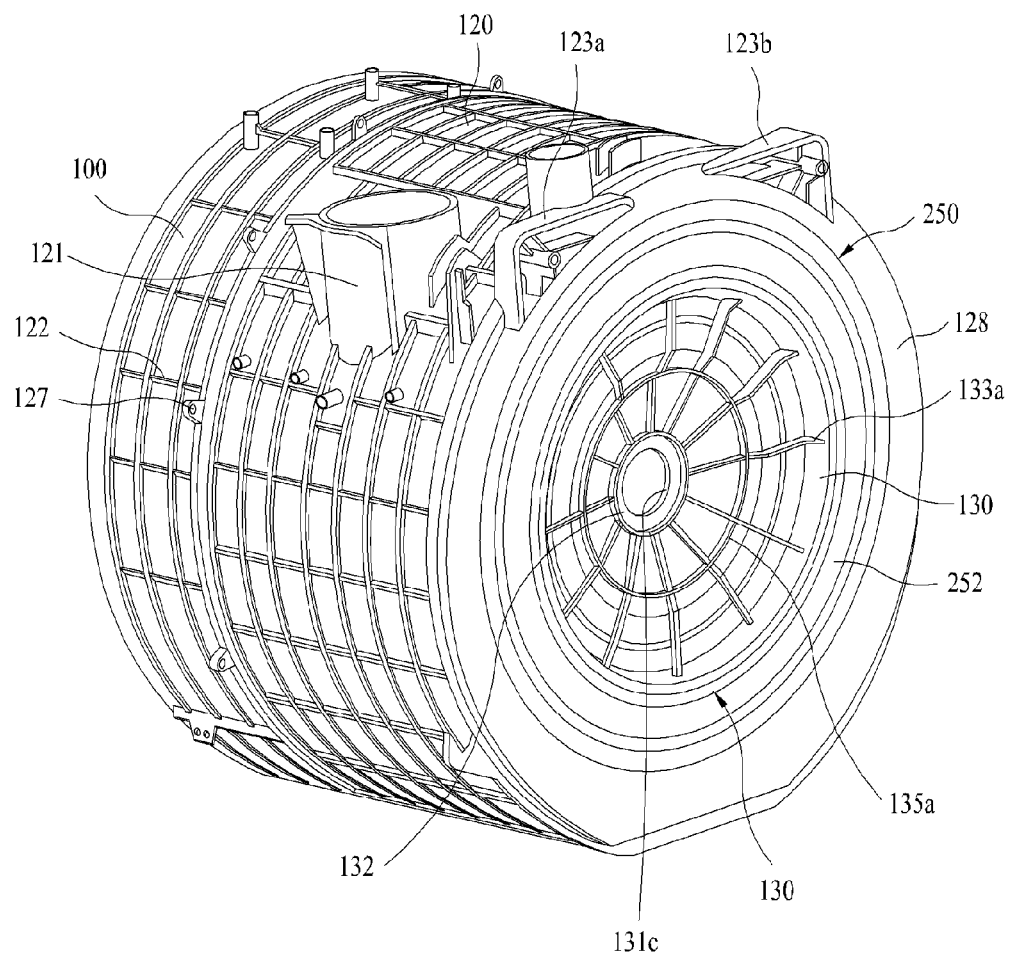
FIG. 4 is a rear-perspective view illustrating a tub rear of the laundry machine.
Figure 5:
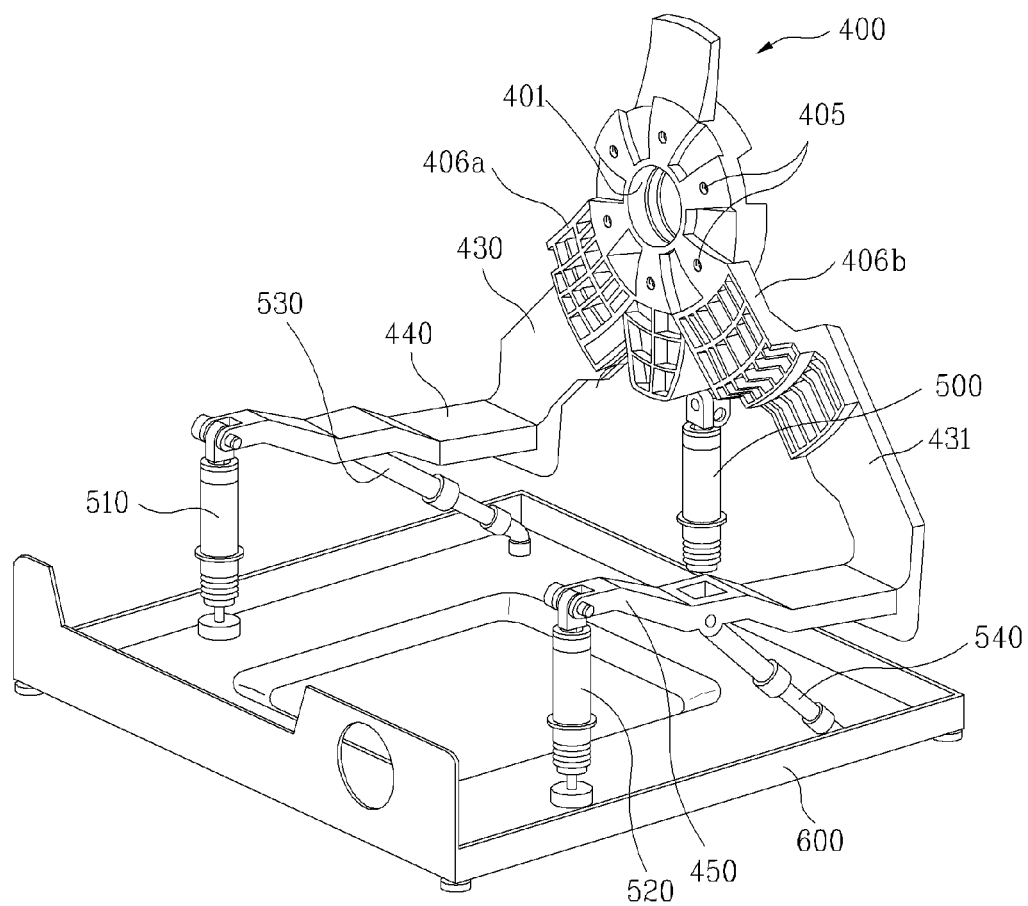
FIG. 5 is a perspective view illustrating a suspension of the laundry machine.

FIGS. 4 and 5 are diagrams illustrating the connection among the tub front 100, the tub rear 120, the tub back 130 and the rear gasket 250.

The tub rear 120 is cylindrical-shaped to surround the drum and a front portion of the tub rear 120 is open and a rear portion of the tub rear 120 has a donut-shaped rear surface 128. The front portion of the tub rear 120 is sealedly coupled to the tub front 100. a diameter of the rear surface 128 of the tub rear 120 is larger than an outer diameter of the tub back 130 enough such that the tub rear 120 has a distance large enough not to interfere with the rear surface 128 of the tub rear 120 even if the tub back 130 is vibrated. The rear gasket 250 is provided in the distance, that is, between the rear surface 128 of the tub rear 120 and the tub back 130. the rear gasket 250 seals the portion between the tub rear 120 and the rear surface 128 of the tub rear 120 and the rear gasket 250 includes the wrinkle portion 252 flexibly extendible enough not to interfere with vibration of the tub back 130.

A hot air outlet 121 for the laundry machine having the drying and washing functions is formed in the tub rear 120. As mentioned above, the hot air outlet 121 needs not be provided in the laundry machine having the washing function, not the drying function.

In the meanwhile, an auxiliary structure for fixedly support the tub with respect to the base may be formed in lower portions of the tub front 100 and the tub rear 120.

A through hole 131c is formed in a center of the tub back 130 to pass the shaft 351 rotating the drum there through and a pressing portion 132 is formed in an outer circumferential surface of the through hole 131c to face a seating surface 401a of the bearing housing 400 which will be described later.

The pressing portion 132 presses a water-seal 10 disposed between the tub back 130 and the bearing housing 400 coupled to each other.

A plurality of radial ribs 133a extended radially and circularly may be formed in an outer portion of the pressing portion 132 to reinforce the rigidity of the tub back 130. the plurality of the securing bosses 135a may be formed along a circumferential direction of the radial ribs 133a to secure the bearing housing 400 to the tub back 130.

Figure 6:
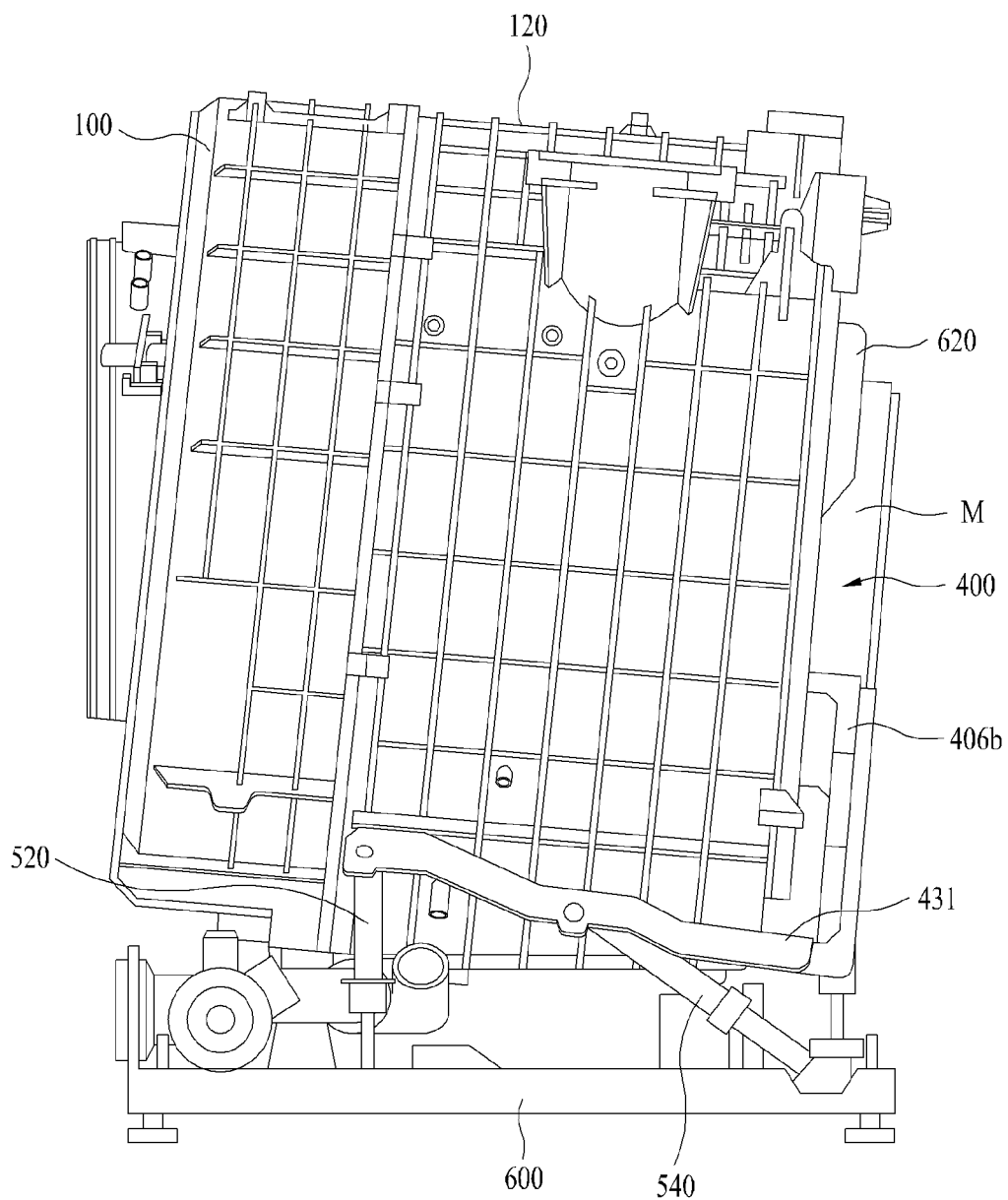
FIG. 6 is a side-sectional view illustrating connection between a tub and the suspension provided in the laundry machine.

FIG. 5 is a diagram illustrating the suspension unit attached to the base 600. FIG. 6 is a diagram illustrating the tub 100 and 120, the bearing housing 400 and the suspension unit coupled to each other.

Here, the suspension unit includes a first weight 431, a second weight 430, a first suspension bracket 450 and a second suspension bracket 440.

The bearing housing includes a shaft hole 401 formed in a center thereof and the shaft 351 passes through the shaft hole 401. A pair of bearings 404 may be inserted in front and rear ends of the shaft hole 401, respectively, and the shaft 351 is rotatably supported by the bearings 404.

The seating surface 401a is formed in an outer circumferential surface of the shaft hole 400 to seat therein the water seal 10 which will be described later. A plurality of tub-back-coupling holes 405 corresponding to the though holes of the tub back 130 may be formed in an outer portion of the shaft hole 401. A motor mounting portion (not shown) is formed in rear of the bearing housing 400 to mount the motor therein.

The bearing housing 400 is coupled to the tub back 130 by an auxiliary securing material passing the through hole 405. Here, the water seal 10 is disposed between the tub back 130 and the bearing housing to maintain gas tight of the tub back and the bearing housing.

A first extended portion 406a and a second extended portion 406b are formed toward both opposite portions of the bearing housing radially. The first and second weights 431 and 430 are connected to the first and second extended portions 406a and 406b, respectively, and the first and second suspension brackets 450 and 440 are connected to the first and second weights 431 and 430, respectively.

Here, the first extended portion 406a, the first weight 406b and the first suspension bracket 450 are symmetric to the second extended portion 406b, the second weight 430 and the second suspension bracket 440, respectively. Here, the first and second weights 431 and 430 are used to balance a mass center of the drum having received the laundry and they are also used as mass of the vibrating system in which the drum is vibrated.

The suspension unit includes vertical suspensions for suspending in the forward/rearward direction and horizontal suspensions for suspending in the rightward/leftward direction. One of the vertical suspensions is provided in a rear portion and two of the vertical suspensions are in a front portion with respect to a center of the base. Two suspensions obliquely installed in the rightward/leftward direction are provided in both opposite side portions.

The suspension unit includes a first cylinder spring 520, a second cylinder spring 510, a third cylinder spring 500, a first cylinder damper 540 and a second cylinder damper 530.

The cylinder spring is configured of a cylinder, a piston and a spring installed between the cylinder and the piston. As it is a cylinder-spring shape, the cylinder spring has the length changeable stably when suspended. The cylinder is connected to the suspension bracket and the piston is connected to the base. The cylinder damper generates a damping effect by using friction-resistance while the piston is moving within the cylinder.

The first cylinder spring 520 is provided between the first suspension bracket 450 and the base 600. The second cylinder spring 510 is provided between the second suspension bracket 440 and the base 600. The third cylinder spring 500 is directly connected between the bearing housing 400 and the base 600. Such the cylinder springs suspendedly support the bearing housing in one rear portion and two front right/left portions of the base 600.

The first cylinder damper 540 is installed obliquely between the first suspension bracket 450 and the rear portion of the base. The second cylinder damper 530 is installed obliquely between the second suspension bracket 440 and the rear portion of the base.

The third cylinder spring 500 is provided in a center of the rear portion of the base and the first cylinder spring 520 and the second cylinder spring 510 are located in both right and left sides of a front portion of the base. The first cylinder damper 540 and the second cylinder damper 530 are located between the rear portion where the third cylinder spring 500 and the front portion where the first cylinder damper 540 is installed and between the rear portion and another front portion where the second cylinder damper 530 is installed, respectively, with being symmetrical to each other. Here, the cylinder springs are connected to the base 600 by rubber-bushing.

As follows, the water seal 10 provided to maintain the gas tight between the tub back and the bearing housing will be described in reference to FIGS. 7 to 9.

Figure 7:
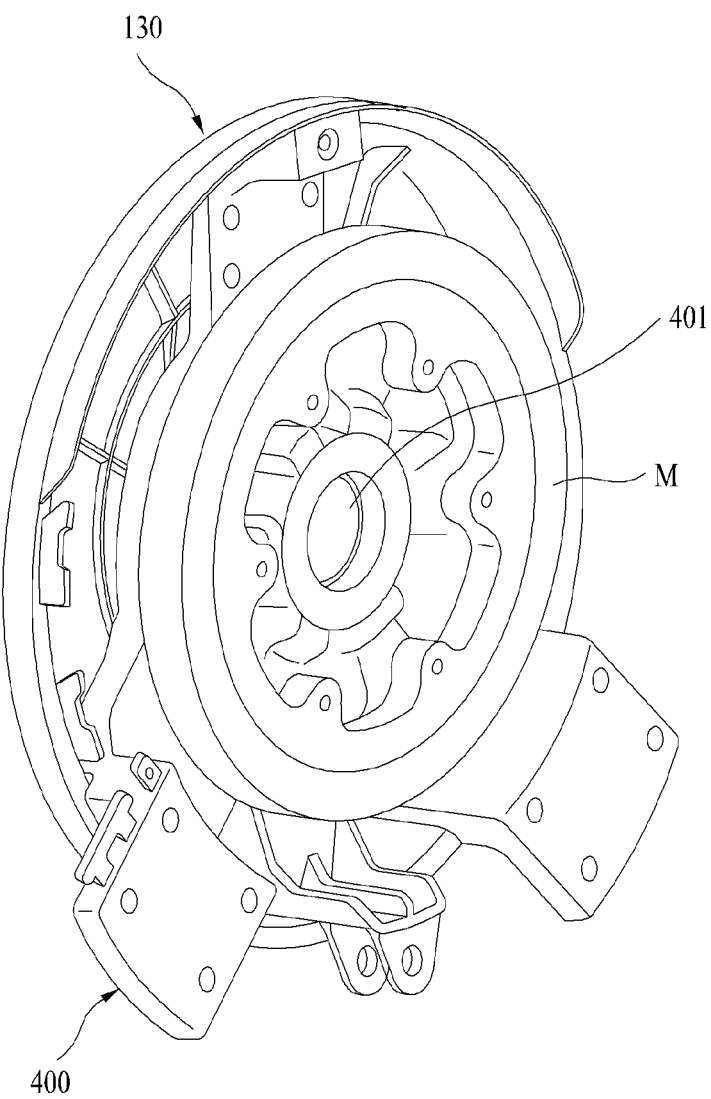
FIG. 7 is a perspective view illustrating connection among a tub back, bearing housing and motor provided in the laundry machine.
Figure 8:
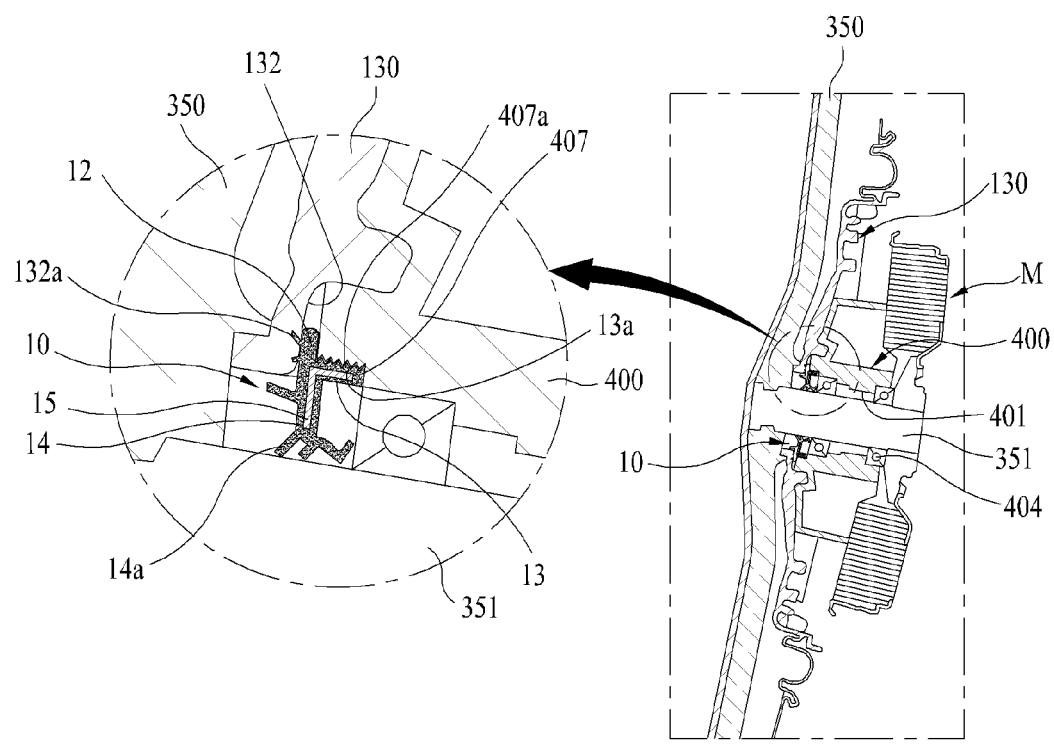
FIG. 8 is a sectional view illustrating a connection state of a water chamber provided in the washing machine.

FIG. 7 is a perspective view illustrating the connection state among the tub back, the bearing housing and the motor and FIG. 8 is a sectional view illustrating the connecting state of the water seal. FIG. 9 is an exploded sectional view illustrating the connecting state of the water seal.

As mentioned above, the tub back 130 is rotatably coupled to the rear portion of the tub rear 120 by the auxiliary rear gasket 250. The bearing housing 400 is fastened to the rear portion of the tub back 130 by the auxiliary fastening member, for example, a bolt. The shaft 351 is secured to the spider 350 of the drum via the center of the tub back 130 in the state of being supported by the bearing housing 400.

The shaft 351 is connected to the spider 350 to rotate the drum via the spider 350. The tub back 130 is located apart a predetermined distance from the drum or the spider 350 and the bearing housing is located in the rear portion of the tub back 130. The motor is located in the bearing housing 400 and a bearing 404 is provided in the bearing housing 400 to support the shaft rotatably.

Here, the spider 350, the shaft 451 and the rotor of the motor are the rotational-moving configurations. The bearing housing 400 and the tub back 130 are the non-moving configurations. As a result, the shaft is rotated, passing through the unmoving tub back 130 and bearing housing 400. Here, the water to wash the laundry is received in the front portion of the tub back 130 and thus it is quite important to prevent the water from leaking toward the rear portion of the tub back 130 via the shaft 351.

The gas tight between the tub back 130 and the bearing housing and between the bearing housing 400 and the shaft 351 which form the rear portion of the tub rear 120 should be maintain. That is, the gas tight between both of the tub back 130 and the bearing housing and the shaft passing through both of them should be maintained to maintain the gas tight of the tub. For that, the water seal 10 is insertedly provided between the tub back 130 and the bearing housing 100.

The bearing housing 400 includes the shaft hole 401 formed in a center thereof and the shaft 351 is rotatably inserted in the shaft hole 401. A pair of bearings 404 is fixedly inserted in front and rear portions of the shaft hole 401 to guide the rotation of the shaft 351, respectively.

A securing step 406 is formed in a front end of the shaft hole 401, with a diameter larger than a diameter of the shaft hole 401, and the water seal 10 is insertedyl secured to the securing step 407. A plurality of engaging projections 407a may be formed in an inner circumferential surface of the securing step 407 to maintain the secured state of the water seal 10, having a screw thread shape.

The water seal 10 includes a water seal body 12, a securing rib 13 and a sealing rib 14. The water seal body 12 is ring-shaped and it has a hollow to insert the shaft 351 therein. The securing rib 13 is extendedly projected to a rear portion of the water seal body 12, that is, toward the bearing housing 400 to be insertedly secured to the securing step 407 of the bearing housing 400. The sealing rib 14 is extendedly projected from the inner circumferential surface of the water seal to an outer circumferential surface of the shaft 351. Here, the water seal 10 may be formed of flexible material, for example, silicon, Teflon and rubber.

The water seal body 12 formed in an annular plate shape having a predetermined thickness is disposed between the bearing housing 400 and the tub back 130 to maintain the gas tight between the bearing housing 400 and the tub back 130. Here, the bearing housing 400 and the tub back 130 are fastened by a fastening member, for example, a bolt.

The securing rib 13 has an outer circumferential surface corresponding to the securing step 407 formed in an inner circumferential surface of a front end of the shaft hole 401 of the bearing housing 400 and a plurality of engaging protrusions 13a to be insertedly engaged with the engaging protrusions 407a formed in the securing projection 407.

Here, it is preferable that the length of the securing rib 13 is extended to the bearing 404 provided in the bearing housing 400. The securing rib 13 covers the inside of the bearing housing 400 to the bearing 404 such that the gas tight may be maintained.

In the meanwhile, the water seal 10 may be molded by injecting. Here, an reinforcing member 15 for maintaining the shaft of the water seal 10 may be inserted and molded in the water seal body 12, in other words, toward the shaft 351 and the securing rib 13. the reinforcing member 15 is circular-ring-shaped according to the shape of the water seal 10 and it has a '⊓' shaped section to reinforce rigidity of the securing rib 13 and the sealing rib 14.

Such the reinforcing member 15 is formed of metal material only to maintain the shape of the water seal 10. if the water seal 10 is inserted in the shaft hole 401 of the bearing housing 400, a predetermined portion of the securing rib 13 is disposed between an outer circumferential surface of the reinforcement member 15 and the inner circumferential surface of the shaft hole 401 such that the soft securing rib 13 may be compressed effectively to maintain the gas tight more securely.

The sealing rib 14 is extended from the inner circumferential surface of the water seal body 12 toward the outer circumferential surface of the shaft 351 in a perpendicular direction with respect to an axial direction of the shaft 351. An oblique sealing portion 14a in contact with the outer circumferential surface of the shaft 351 is formed in an end of such the sealing rib 14. the oblique sealing portion 14a is extended to contact with the outer circumferential surface of the shaft 351 and it is preferable that the plurality of the oblique sealing portions 14a are formed, with being obliquely opposite to the axial direction of the shaft 351.

A plurality of sealing grooves 132a may be formed in the pressing portion 132 of the tub back 130 and the sealing grooves 132a are located to correspond the water seal body 12. The flexible water seal body 12 disposed between the tub back 130 and the bearing housing 400 when the tub back 130 is pressed by the bearing housing 400 is shrunk to be inserted in the sealing grooves 132a.

The connection among tub back 130, the water seal 10 and the bearing housing 400 mentioned above will be described in reference to FIG. 9.

Figure 9:
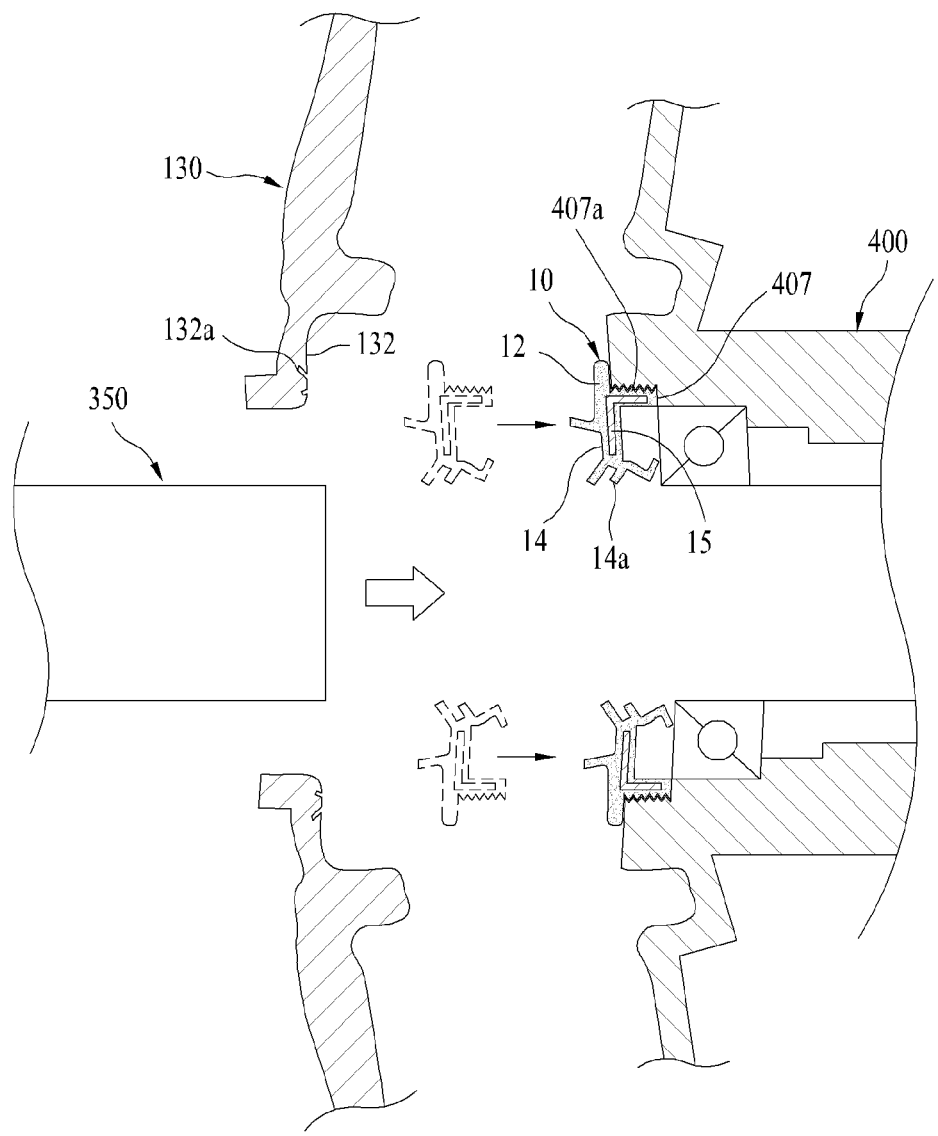
FIG. 9 is an exploded sectional view illustrating the connection state of the water chamber.

As shown in FIG. 9, the securing rib 13 is inserted in the securing projection 407 formed in the shaft hole 401 of the bearing housing 400 to secure the water seal 10 to the bearing housing 400.

At this time, the securing rib 13 inserted in the securing projection 407 has the engaging protrusions 13a of the water seal 10 engaged to the engaging projections 407a formed in the bearing housing 400 such that the securing of the water seal 10 may be maintained.

Hence, the tub back 130 is fastened to the bearing housing 400 at the outer surface of the water seal 10 by the auxiliary fastening member. Here, the water seal body 12 is disposed between the tub back 130 and the bearing housing 400 and the gas tight there between is maintained by the tub back 130 pressed toward the bearing housing 400.

At this time, the predetermined portion of the water seal body 12 disposed between the tub back 130 and the bearing housing 400 is shrunk by the pressure of the tub back 130 enough to be inserted in the sealing grooves 132a formed in the tub back 130. Because of that, the water seal body 12 shrunk to be inserted in the sealing grooves 132a may maintain the gas tight between the tub back 130 and the bearing housing 400 more stably and securely.

In the meanwhile, once the connection among the water seal 10, the bearing housing 400 and the tub back 130 is complete, the shaft 351 is inserted in both of the tub back 130 and the bearing housing 400 and it is rotatably supported by the bearings 404 of the bearing housing 400. also, the portion of the shaft 351 inserted in the tub back 130 and the bearing housing 400 has its gastight maintained by the sealing rib 14 of the water seal 10 disposed between the tub back 130 and the bearing housing 400. That is, the end of the inner circumferential surface of the sealing rib 14 is formed in contact with the outer circumferential surface of the shaft 351 to maintain the gas tight.

The connecting structure between the water seal 10 secured to the bearing housing 400 and the tub back 130 may enable the tub back 130 and the bearing housing 400 to be assembled conveniently. As the bearing housing 400 is separated from the tub back 130, the water seal 10 is separated together with the bearing housing 400 and then required maintenance may be performed conveniently.

Furthermore, the tub of the laundry machine according to this embodiment is directly secured to the cabinet, not moving. As a result, the diameter of the tub may be enlarged and the capacity of the tub as well as the drum may be enlarged also.

A still further, only the predetermined portion of the rotating drum is supported and thus the capacity of the drum inside may be improved, compared with the conventional laundry machine having the both opposite ends of the drum supported. As a result, the number of required parts may be reduced enough to improve productivity.

A still further, the tub is fixedly secured to the cabinet. In case the vibration or shock is transmitted to the tub integrally assembled with the cabinet, the tub itself is shaken by the vibration or shock and also the weight of the cabinet is applied to the tub. As a result, the rigidity of the tub may be improved and the overall vibration technical feature of the drum type laundry machine may be improved advantageously.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A laundry machine, comprising:
   a tub to hold water therein, the tub having an opening at a rear portion thereof;
   a drum rotatably placed in the tub;
   a shaft connected to the drum;
   a bearing housing rotatably supporting the shaft, wherein the bearing housing includes a shaft hole formed in a center of the bearing housing and a securing step formed at a front end of the shaft hole;
   a motor to rotate the shaft;
   a tub back through the shaft passes and fixed to the bearing housing;
   a suspension attached to the bearing housing to reduce vibration of the drum;
   a flexible material watertightly connected between an circumferential edge of the opening of the tub and the tub back, the flexible material preventing the water inside the tub from leaking toward the bearing housing and allowing the tub back to move relatively to the tub; and
   a water seal to prevent the water inside the tub from leaking through the shaft and the tub back, wherein the water seal includes:
      a water seal body disposed between the bearing housing and the tub back in an axial direction to maintain a watertight seal between the bearing housing and the tub back;
      a securing rib inserted into and secured to the securing step of the bearing housing;
      a sealing rib that extendedly projects from an inner circumferential surface of the water seal body to the shaft to maintain the water tight seal between the bearing housing and the shaft; and
      a reinforcing member that maintains a shape of the water seal, wherein the reinforcing member is inserted into and molded within the water seal body and the securing rib.

2. The laundry machine as claimed in claim 1, wherein a pressing portion is formed in the tub back to press the water seal body toward the bearing housing.

3. The laundry machine as claimed in claim 2, wherein a ring-shaped sealing groove is formed in the pressing portion to improve a sealing performance of the water seal body.

4. The laundry machine as claimed in claim 1, wherein the securing rib that extends toward the bearing housing to be secured to the bearing housing, and wherein a securing projection is formed in the bearing housing to insert the securing rib is inserted.

5. The laundry machine as claimed in claim 4, wherein a plurality of engaging projections are formed in an inner circumferential surface of the securing projection and a plurality of engaging protrusions is formed in an outer circumferential surface of the securing rib to be insertedly engaged with the plurality of engaging projections formed in the inner circumferential surface of the securing projection.

6. The laundry machine as claimed in claim 1, wherein the shaft hole rotatably supports the shaft, and wherein the water seal is insertedly secured to the shaft hole.

7. The laundry machine as claimed in claim 6, wherein a plurality of the engaging projections are formed inner circumferential surface of the shaft hole, and a plurality of engaging grooves are formed in an outer circumferential surface of the securing rib to be insertedly engaged with the engaging projections.

8. The laundry machine as claimed in claim 1, wherein a plurality of oblique sealing ribs is formed in an end of the sealing rib, that contacts the shaft.

9. The laundry machine as claimed in claim 1, wherein the water seal body, the securing rib, and the sealing rib are integrally formed as one body.

10. The laundry machine as claimed in claim 1, wherein the the tub is supported more rigidly than the drum is supported.

* * * * *